May 12, 1970 LE ROY T. CUSHMAN 3,512,089

FM SIGNAL DEVIATION INDICATOR

Filed Feb. 24, 1966

INVENTOR.
Le Roy T. Cushman

BY

ATTORNEYS

United States Patent Office 3,512,089

Patented May 12, 1970

3,512,089

FM SIGNAL DEVIATION INDICATOR

Le Roy T. Cushman, 10200 Wolfe Road, Apt. 310, Cupertino, Calif. 95014

Filed Feb. 24, 1966, Ser. No. 529,827
Int. Cl. H04b *1/26*
U.S. Cl. 325—363 6 Claims

ABSTRACT OF THE DISCLOSURE

A communications test apparatus for indicating FM signal deviation of both external and internally generated signals. A mixer is coupled to an internal FM signal generator which produces an intermediate frequency signal whose deviation is sensed by an FM deviation meter. At the same time, this internally generated signal mixes with the local oscillator signal to provide an external signal of the desired frequency. Thus, the communications receiver is tested. When the signal generator is decoupled the mixer receives an external frequency modulated signal which when mixed with a local oscillator signal produces an intermediate frequency signal whose deviation is also indicated by the same indicator means.

Figure 1:
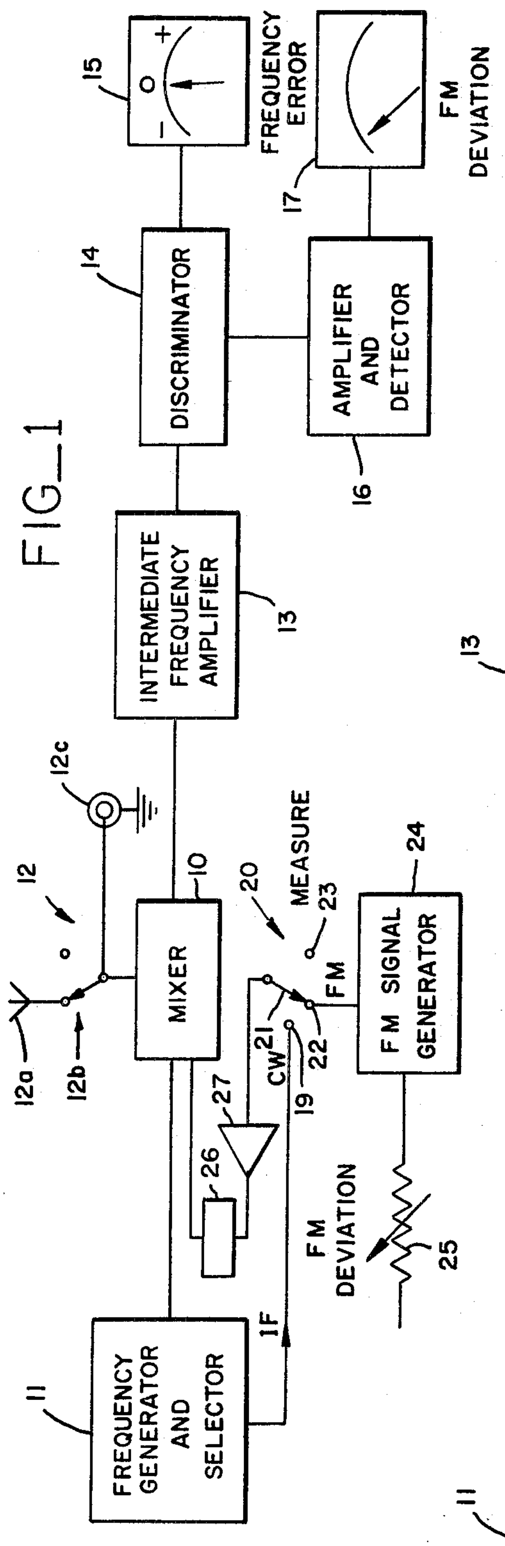

The present invention is directed to FM communications test apparatus and more particularly to apparatus which is capable of sensing the frequency deviation of an incoming frequency modulated signal to be tested, or, alternatively, producing an FM test signal of a predetermined frequency deviation and sensing the amount of such deviation.

Communications monitors or test apparatus must normally perform many complex functions with high accuracy. For example, the Federal Communications Commission requires that the users of two-way communications systems measure both transmitter frequency and frequency deviation periodically, and furthermore require that these fall within predetermined limits. Moreover, there is also a need to provide a reliable signal generator to test similar characteristics of the communication system receiver. In the past, all of the above functions could be done but only with a multitude of equipment rather than with a single communications monitor.

In general, it is an object of the present invention to provide communications test apparatus which has a plurality of testing functions while using a minimum number of components.

Another object of the invention is to provide a communications monitor which indicates the frequency deviation of a frequency modulated signal which is either internally generated by the device or received from some external generating source.

Another object of the invention is to provide for easy optimization of a receiver for its assigned frequency channel.

Additional objects and features of the invention will appear from the following description in which the preferred embodiment is set forth in detail in conjunction with the accompanying drawing.

Figure 2:
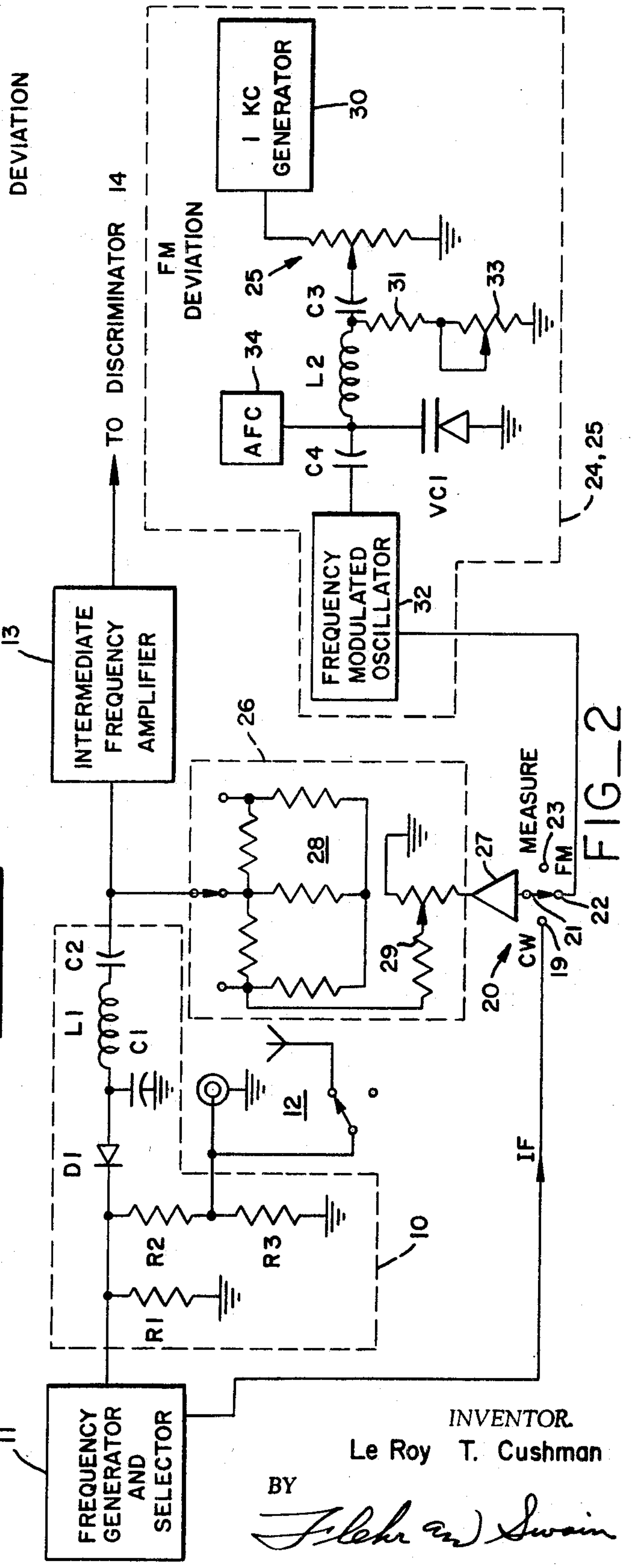

Referring to the drawing:

FIG. 1 is a block diagram of a communciation test apparatus incorporating the invention; and FIG. 2 is a detailed circuit diagram of a portion of FIG. 1.

Referring to FIG. 1, the communications test apparatus includes a heterodyne receiver of the frequency modulation type having the components normally associated with such a receiver. These are a mixer 10 which has coupled to it a local oscillator 11 which has been designated as a frequency generator and selector, the frequency generator

11 beating with an incoming radio frequency signal provided by signal coupling means 12. The difference signal is, in accordance with well known theory, an intermediate frequency signal which is coupled into an intermediate frequency amplifier 13.

Radio frequency signal coupling means 12 consists of an antenna **12*a* which is coupled to mixer 10 through a switch 12*b* and a coaxial radio frequency terminal 12*c* which is directly coupled to mixer 10**. As will be discussed in greater detail below, the use to which the testing device is being put determines which radio frequency coupling device is utilized.

Intermediate frequency amplifier 13 is coupled to a discriminator 14 and a frequency error indicating meter 15 which is normally centered in the center of the meter scale at the zero value as shown. This occurs when the beat frequency produced by the mixer, which is the intermediate frequency, has a predetermined value such as 10 megacycles. If this value is either above or below the predetermined intermediate frequency standard, the meter will indicate a plus or minus reading, depending on the polarity of the variance. In this manner, frequency error meter 15 indicates the variance of an incoming radio frequency signal from its assigned channel. More specifically, frequency generator and selector 11 generates a local oscillator frequency input to mixer 10 which is selected to have a frequency value either above or below the assigned channel by the amount of the intermediate frequency. Thus, an incoming signal to be tested, which is precisely on its assigned frequency channel, will produce an intermediate frequency equal to the predetermined intermediate frequency and meter 15 will read "zero" indicating no variance. Similarly, any variance will be indicated.

Coupled to discriminator 14 is means to sense the frequency deviation of any FM signal which is developed at the output of the IF amplifier 13. These include a peak deviation amplifier and detector 16, and a meter 17 which is calibrated to measure FM deviation in a predetermined range. Thus, an incoming signal from either antenna **12*a* or terminal 12*c*, is detected and its frequency deviation indicated by meter 17**.

In accordance with the invention, a switch means 20 is provided which includes a movable switch arm 21 coupled to mixer 10 through a series connected attenuator 26 and an amplifier 27, and terminals 19, 22 and 23. In its first position, the switch arm contacts terminal 19, designated CW, which is coupled to a source of intermediate frequency within selector 11. In this position a CW signal is produced on either antenna **12*a* or terminal 12*c* by the mixing of the IF signal with the output of generator 11. In its second position, a switch arm 21 contacts terminal 22 and completes a connection between the mixer 10 and a frequency modulated signal generator 24. The signal generator provides a frequency modulated signal having a carrier frequency equal to the intermediate frequency. It is modulated by any convenient signal, such as a 1 kilocycle audio signal. The amount of frequency deviation is controlled by a control 25**.

When it is desired to measure the frequency error of a signal from an assigned frequency, switch arm 21 is moved into contact with floating terminal 23 and frequency selector 11 is adjusted in the manner described above. The FM deviation of such a signal will also be indicated by meter 17.

With switch 20 in its second position (as shown), any signal generated by device 24 is coupled into the mixer. Since the carrier frequency of this signal is equal to the intermediate frequency, it is coupled into the intermediate frequency amplifier 13 and thence finally to FM deviation meter 17 to indicate the frequency deviation initially determined by control 25. At the same time, the IF carrier is mixed with the frequency generated by frequency generator 11 to produce an output frequency on either antenna 12_a_ or terminal 12_c_ which is transmitted to a receiver to be tested for its response to a predetermined frequency deviation. Normally, the receiver will be directly coupled by means of a coaxial cable to the mixer through terminal 12_c_. The antenna 12_a_ is normally used for receiving incoming signals to be tested although it may also be used to radiate a low level signal to nearby receivers.

The magnitude of both a CW type output signal and an FM signal are controlled by means of attenuator 26 which is adjustable as will be explained in connection with FIG. 2. The operation of the attenuator to precisely adjust the final output signal is more fully explained in Pat. 3,199,047 issued Aug. 3, 1965 to Le Roy T. Cushman and entitled "Signal Generator."

With the coupling of the FM signal generator 24 to the mixer by means of switch 20, the heterodyning receiver circuit is thereby used in a dual capacity. First, it is used as an ordinary FM heterodyne receiver which detects frequency variation of an incoming signal, and as a means of detecting the FM deviation of such signal by meter 17. In this condition, generator 24 is decoupled from mixer 10 and deactivated with switch 20 in its third or "Measure" position. Alternatively, the circuit can be used as a frequency generator by moving switch 20 to its first position with switch arm 21 contacting terminal 22 so that the local oscillator frequency from generator 11 is mixed and added to the FM signal generator 24 to produce a radio frequency output. The frequency deviation of this radio frequency output is again detected by meter 17 since the carrier frequency generated by signal generator 24 is the same as the intermediate frequency. CW signal generation is also accomplished by movement of switch arm 21 to terminal 19.

FIG. 2 illustrates, in schematic form, the mixer 10 and the signal generator 24 and control 25, as indicated by the broken line blocks. The local oscillator or frequency generator and selector 11 is coupled into the diode mixer D1 by means of a parallel connected resistive terminating circuit R1, R2, R3. The parallel combination of R1 with series connected resistors R2 and R3 provide a characteristic impedance such as, for example, 50 ohms which terminates the signal generator 11. The radio frequency signal coupling means 12 is coupled into the mixer by a tap between R2 and R3. The other side of diode D1 is bypassed to ground by a high frequency capacitor C1 and is coupled to intermediate frequency amplifier 13 through a low pass filter comprising series connected inductor L1 and capacitor C2.

The FM signal generator 24 is coupled into the mixer between the low pass filter circuit L1, C2 and intermediate frequency amplifier 13 through switch 20 and attenuator 26, as described above. An amplifier 27 is also included between the switch and attenuator 26. Attenuator 26 is illustrated in detail and includes a three-step multiplication pad 28 and a vernier potentiometer 29.

The signal generator includes, as a primary source, a 1 kilocycle audio generator 30 whose output amplitude is regulated by a potentiometer or control device 25 which is coupled through a series LC circuit (L2, C3) to a solid state voltage sensitive capacitor VC1 (typically known as a varicap) which is grounded. The output frequency of generator 30 is not critical and may be varied in accordance with the specific requirements of the circuit. The varicap is coupled to and serves to frequency modulate an oscillator 32 through a series connected capacitor C4. The output of the frequency modulated oscillator is coupled to terminal 22 of switch 20. A series coupled resistor 31 and potentiometer 33 are connected to L2 and shunt VC1. Adjustment of the potentiometer varies the bias on VC1 and causes an attendant vernier shift of the frequency of oscillator 32.

In operation, the FM signal generator provides an FM signal having a carrier frequency, as determined by oscillator 32, equal to the intermediate frequency, and is modulated by means of the variable capacitor acting on the oscillator. Moreover, the frequency deviation is controlled by the control 25 since a fundamental characteristic of a frequency modulated wave is that the frequency deviation is proportional to the peak amplitude of the modulating signal, which, in this case, is the 1 kilocycle audio signal from generator 30. A commonly used AFC device, as schematically indicated as block 34, provides frequency stability.

Moreover, the frequency of the oscillator 32 can be slightly shifted either above or below the intermediate frequency. This enables a receiver being tested to be peaked for optimum reception thereby assuring that the receiver is most sensitive at the channel desired. The vernier adjustment capability of potentiometer 33 allows the output test signal of the present test apparatus to be moved through the receiver bandpass. Thus, after a rough calibration of the receiver to its assigned channel where signal reception is adequate, the vernier procedure can be used for finding the optimum reception. Frequency error meter 15 will indicate the amount of needed adjustment.

By way of example, a circuit was constructed in accordance with FIG. 2 having the following component types and values:

Diode D1—1N82A
R1—68 ohms
R2—22 ohms
R3—120 ohms
C1—100 picofarads
C2—.01 microfarad
L1—.47 microhenry Thus, the improved communications test apparatus herein disclosed senses the FM signal deviation of both incoming and internally generated signals. This is done by utilizing a minimum number of components and without any undesirable side effects such as multiplication which occurs when frequency modulated signals are passed through harmonic generators. In addition, means have been provided for easily optimizing the reception of receivers being tested.

I claim:

1. In a communications test apparatus, a heterodyne receiver of the frequency modulation type having a predetermined intermediate frequency and including an adjustable local oscillator, radio frequency signal coupling means, mixer means coupled to said local oscillator and said radio frequency coupling means, said mixer producing said intermediate frequency output signal, an intermediate frequency amplifier coupled to the signal output of said mixer, means coupled to the output of said intermediate frequency amplifier for indicating the frequency deviation of such output, a frequency modulated signal generator for generating a signal having a frequency equal to said intermediate frequency and including means to modulate such signal with a predetermined frequency deviation, and means for selectively coupling and decoupling said signal generator to and from said mixer, said mixer with said signal generator coupled having an intermediate frequency signal output identical to said frequency modulated signal of said signal generator and also mixing such intermediate frequency signal with a signal from said local oscillator to apply the sum and difference of such signals to said radio frequency coupling means the frequency deviation of said signal applied to said coupling means being identical to said frequency deviation of said frequency modulated signal such frequency deviation being concurrently sensed by said indicating means coupled to said intermediate frequency amplifier, said mixer with said signal generator decoupled being responsive to external radio frequency signals applied through said coupling means to mix such external signal with said local oscillator signal and produce a difference output signal of substantially said intermediate frequency, said indicating means sensing the frequency direction of such output signal.

2. In a communications test apparatus as in claim 1 where said selective coupling means includes switch means having first and second positions, said switch means in said first position coupling said signal generator to said mixer, and in said second position decoupling said generator from said mixer.

3. In a communications test apparatus as in claim 2 where said mixer is a two terminal component, one terminal of said component being coupled to said adjustable local oscillator and said radio frequency signal coupling means, and the other terminal of said component coupled to said intermediate frequency amplifier and said switch means.

4. In a communications test apparatus as in claim 3 where said component is a diode and said switch means includes a movable switch arm coupled to said other terminal of said diode, such switch arm being movable between first and second terminals, said first terminal being coupled to said frequency modulated signal generator, and said second terminal floating.

5. In a communications test apparatus as in claim 1 in which means are provided for indicating said intermediate frequency.

6. In a communications test apparatus according to claim 1 in which means are coupled to said frequency modulated signal generator for varying said generated signal over a predetermined frequency range which includes said intermediate frequency.

References Cited

UNITED STATES PATENTS

| | | | |
|---|---|---|---|
| 2,603,742 | 7/1952 | Larson | 325—363 XR |
| 2,883,616 | 4/1959 | Sabaroff | 325—363 XR |
| 2,915,897 | 12/1959 | Hoffman | 324—79 XR |
| 2,972,108 | 2/1961 | Stone | 324—79 |
| 3,071,726 | 1/1963 | Nelson | 324—79 |
| 3,283,257 | 11/1966 | Boyce | 325—363 XR |

ROBERT L. GRIFFIN, Primary Examiner

R. S. BELL, Assistant Examiner

U.S. Cl. X.R.

324—79; 325—67; 329—111; 332—20